United States Patent [19]
Dirks

[11] 3,734,263
[45] May 22, 1973

[54] REVOLVABLE STATION FOR PROCESSING A MOVABLE PROCESSION OF FACTORY-WORK PIECES SUCH AS ANIMAL CARCASSES

[76] Inventor: Arthur A. Dirks, 5357 North 47th Street, Omaha, Nebr. 68114

[22] Filed: July 2, 1971

[21] Appl. No.: 159,209

[52] U.S. Cl..................198/19, 29/200 A, 17/24, 104/35, 198/177
[51] Int. Cl..................................B23q 7/02
[58] Field of Search..................198/19, 103, 177, 198/209; 17/24, 50; 29/200 A; 104/18, 20, 21, 35, 89, 91, 172 B, 172 S

[56] References Cited
UNITED STATES PATENTS

| | | | |
|---|---|---|---|
| 2,872,709 | 2/1959 | Brem | 24/200 A |
| 3,033,346 | 5/1962 | Gardiner | 198/103 |
| 3,339,494 | 9/1967 | Lauber | 104/21 |

Primary Examiner—Gerald M. Forlenza
Assistant Examiner—D. W. Keen
Attorney—George R. Nimmer

[57] ABSTRACT

There is provided novel revolvable processing stations adapted for use within assembly-line type factory installations wherein a procession of factory-work pieces, such as animal carcasses, carried at selected intervals along a movable conveyor are brought consecutively alongside a series of processing stations. In the meat processing plant situation, a continuously movable elevated conveyor-line passes substantially arcuately alongside each rotatable processing station and at a desired velocity synchronization therewith whereby operating personnel positioned upon the rotatable dressing station might perform their appointed tasks upon the continuously movable procession of animal carcasses in an exceedingly proficient and rapid manner. The novel rotatable dressing station herein might also include one or more stationary platforms in conjunction therewith whereby operating personnel might take more effective advantage of the dressing station rotatable portion. More sophisticated embodiments of the novel dressing station herein include for the rotatable portion, a plurality of elevations therefor and pivotably connected separable chordal sections for more efficient and versatile utilization of the novel dressing station.

14 Claims, 7 Drawing Figures

Patented May 22, 1973

ARTHUR A. DIRKS
INVENTOR.

BY *George R. Nimmer*
ATTORNEY

Patented May 22, 1973

ARTHUR A. DIRKS
INVENTOR.

BY George R Nimmer
ATTORNEY

Patented May 22, 1973 3,734,263

ARTHUR A. DIRKS
INVENTOR.

BY George R. Nimmer
ATTORNEY

REVOLVABLE STATION FOR PROCESSING A MOVABLE PROCESSION OF FACTORY-WORK PIECES SUCH AS ANIMAL CARCASSES

As has long been practiced in the prior art, meat animals are slaughtered and dressed in meat processing plants on a continuous factory-like assembly-line basis. For example, as disclosed in U.S. Pat. No. 2,640,225(L.T.Force, et al.-June 2, 1953), cattle, hogs, and other meat animals are slaughtered in rapid succession, the animal carcasses being hung at some selected regular interval from an overhead rail or other movable conveyor which travels throughout the meat processing plant. Carcass dressing stations are positioned at several locations within the meat processing plant, the overhead conveyor-line taking a tortious route through the meat processing plant and alongside the series of carcass dressing stations. Thus, the incrementally spaced animal carcasses hanging from the overhead movable conveyor-line can be worked upon by specialist personnel at each dressing station in factory-like assembly-line fashion, whereby a continuous hourly "kill-rate" or "production-rate" of animal slaughtering and processing can be achieved.

In prior art meat animal slaughtering and processing plants, as exemplified in the said L. T. Force, et al., patent, the tortuous route taken by the overhead movable conveyor-line throughout the factory comprises a plurality of successive linear-paths; the typical meat dressing station takes the form of an elongate stationary bench or table extending in parallelism along one of the conveyor-line linear-paths. Such prevalent installations are sometimes referred to as "stationary straight bench" type factory installations. In the highly economically competitive meat processing industry, there is the necessary continual quest to achieve ever higher "production-rates" i.e., "kill-rates." In this quest, the industry has concentrated its efforts almost exclusively to refinements of the prevalent "straight stationary bench" assembly-line concept; while such efforts have met with noteworthy successes, industry authorities have lately come to realize the efficiency limitations of the "stationary straight bench" concept.

Contemporary design authorities for assembly-line installations have proposed the "reciprocating straight bench" type factory installation wherein the bench-like dressing station (carrying operating personnel thereon) moves linearly alongside of, and at a synchonized velocity with, a lineal-path of the movable conveyor. In this manner, the operating personnel upon the linearly moving processing station are in operational or working relationship with the movable factory-work pieces for a longer time period. While higher "production-rates" are apparently achievable with the "reciprocating straight bench" concept, as compared to the earlier "stationary straight bench" concept, linearly reciprocating straight benches are structurally cumbersome and expensive and require a great deal of factory floor space to accomplish the desired result. Thus, inordinate degrees of capital expenditure are required to effect higher "production-rates" through the "reciprocating straight bench" type assembly-line processing stations.

Accordingly, it is the general object of the present invention to provide an unusually efficient novel processing station for use in factory-type assembly-line installations whereby unusually high "production rates" can be achieved on a continuous and sustained basis.

It is another general object to provide an unusually efficient novel animal carcass dressing station for use in factory-type meat processing installations whereby unusually high "kill rates" can be achieved.

It is another object of the present invention to provide a novel meat dressing station that is structurally economical and reliable, and that is spatially compact such that factory floor costs are minimized.

It is a further object to provide a novel meat dressing station that can be utilized in a variety of specific forms appropriate to the specific type of meat dressing process operation to performed thereat.

It is yet another object to provide a rotatable processing station that is amenable to speed synchronozation with the overhead conveyor-line passing thereby, whereby the "production rate" thereat can be selectively varied appropriate to the factory's desired "production rate."

It is a further object to provide a meat dressing station that will accommodate a plurality of operating personnel thereon such that each operator might conveniently accomplish his assigned task in an efficient manner, without needing to motivate himself along the conveyor-line, and without interfering with the other personnel.

It is another object to provide a carcass dressing station concept wherein sophistocated embodiments thereof might be amenable to difficult carcass dressing operations, even such as carcass viscerating operations.

With the above and other objects and advantages in view, which will become more apparent as this description proceeds, the novel assembly line processing station concept generally comprises a generally horizontal turntable revolvably surrounding an upright-axis and being adapted to carry operating personnel thereon, a generally arcuate proximal segment of the elongate overhead movable conveyor means being spaced a substantially constant radial distance from the turntable upright-axis, and means for causing the turntable and the conveyor arcuate segment to travel at substantially identical angular velocities about said upright-axis, and preferably also at least one stationary platform positioned alongside the rotatable turntable to assist operating personnel to enter and to leave the rotatable turntable.

In the drawings, wherein like characters refer to like parts in the several views, and in which.

Figure 1:
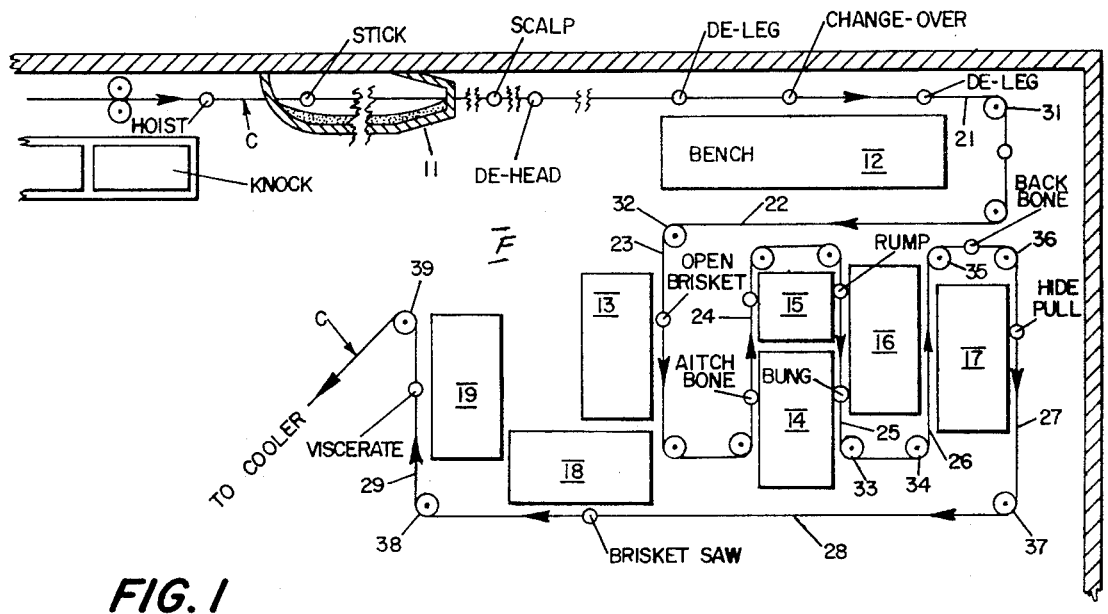
FIG. 1 is a schematic top plan view of a typical prior art meat processing plant assembly-line installation.

Referring initially to the FIG. 1 schematic plan view which describes a typical prior art factory type installation for the dressing of consecutive factory-work pieces such as meat animal carcasses. Conventional installations, are described in numerous prior art publications, as in U.S. Pat. No. 2,640,225, issued on June 2, 1953, to Leonard T. Force, et al. Such prior art type factory installations comprise an elongate continuously movable conveyor, usually in the form of an elongate movable overhead conveyor-line chain "C," the lengthy conveyor-line traversing the factory substantially horizontally above the factory floor "F." The lengthy conveyor-line is provided at regular intervals therealong with shackles, hooks, or similar means for removably engaging the factory-work pieces whereby the consecutive plurality of animal carcasses or the like, each depending from the overhead movable conveyor-line, can be worked upon by personnel or machinery at each carcass dressing station. For example, in the prior art the overhead conveyor-line extends from the animal killing pit 11, thence alongside and above each of a consecutive series of carcass dressing stations 12–19, and finally to a refrigerated storage cooler (not shown) for the finished meat carcass. There are conventional means (not shown) for selecting the speed at which the continuously movable conveyor-line travels, and thus, determining the hourly production rate at which animals are killed, dressed, and ultimately moved into storage. In the prior art, as exemplified by FIG. 1, the individual carcass dressing stations, e.g., 12–19, each comprises an elongate stationary bench or table stably resting upon the factory floor "F" and positioned beneath conveyor-line "C." Thus, each of the several linear-paths 21–29 of continuously movable conveyor-line "C" are appropriate to the use of linearly elongate stationary benches or tables at each of the several carcass dressing stations 12–19. The desired linearity for conveyor-line segments 21–29 is conventionally provided with a plurality of guide-pulleys, e.g., 31–39, each strategically positioned along conveyor-line "C." The carcass splitting and the hide pulling dressing steps might be accomplished on stationary bench or table 17 while the viscerating step might be accomplished on stationary bench or table 19.

Figure 2:
FIG. 2 is a schematic top plan view similar to FIG. 1 showing how the novel revolvable processing stations of the instant invention might be employed within a factory-type installation.

Referring now to FIG. 2, it is schematically indicated that one or more of the carcass dressing operations can be accomplished on the novel turntable processing station concept of the present invention. For example, revolvable turntables 50 (circular) and 50A (hexagonal) are substituted for the stationary elongate bench or table 17, while another circular turntable 50 is substituted for stationary elongate table 19. Each circular turntable 50 surrounds and is continuously rotatable about upright-axis 51 while the regularly polygonal turntable 50A is similarly continuously rotatable about its upright-axis 51A. In FIG. 2, for the purposes of reference and comparison with FIG. 1, guide pulleys 35, 38, and 39 are maintained; however, guide-pulley 36 is eliminated and guide pulley 37 (re-named 37A) is positioned closer to pulley 35. A minor length non-linear proximal-segment portion of the conveyor-line "C" is elevated above each turntable and is spaced a substantially constant radial distance from the turntable upright-axis whereby the conveyor-line proximal-segment and the turntable are adapted to travel at the same angular velocity about the turntable upright-axis. For example, guide pulleys 41–43 provide a 180° arcuate proximal-segment conveyor portion 45 about the upright-axis 51 of each circular turntable 50, while guide pulleys 41A, 42A, and 43A, together provide a 180° arcuate proximal-segment conveyor portion 45A about the polygonal turntable upright-axis 51A. Normally, each of the conveyor-line proximal segments, e.g., 45, 45A, would comprise a plurality of small interpulleys chordal lengths, rather than being perfectly smoothly arcuate. However, not withstanding the presence of a plurality of small chordal lengths of conveyor-line "C," the proximal-segment portions 45–45A would satisfy the requirement herein for "a substantially constant radial spacing from the turntable upright-axis" or "a generally arcuate configuration." The angular extent of the conveyor-line proximal-segment, e.g., 45, 45A, with respect to the turntable upright-axis should be within the range of 30° to 300°, depending upon the type of meat dressing operation to be performed at the turntable meat dressing station and the number and spacing of the pulleys employed.

Figure 3:
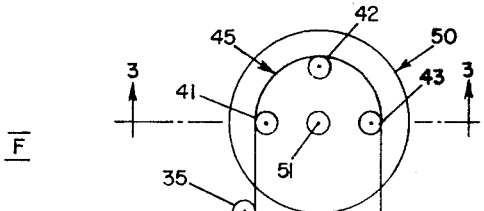
FIG. 3 is a schematic elevational view (taken along lines 3—3 of FIG. 2) showing that the rotatable turntable has an angular speed in synchronization with the movable conveyor means for the procession of factory-work pieces.
Figure 3:
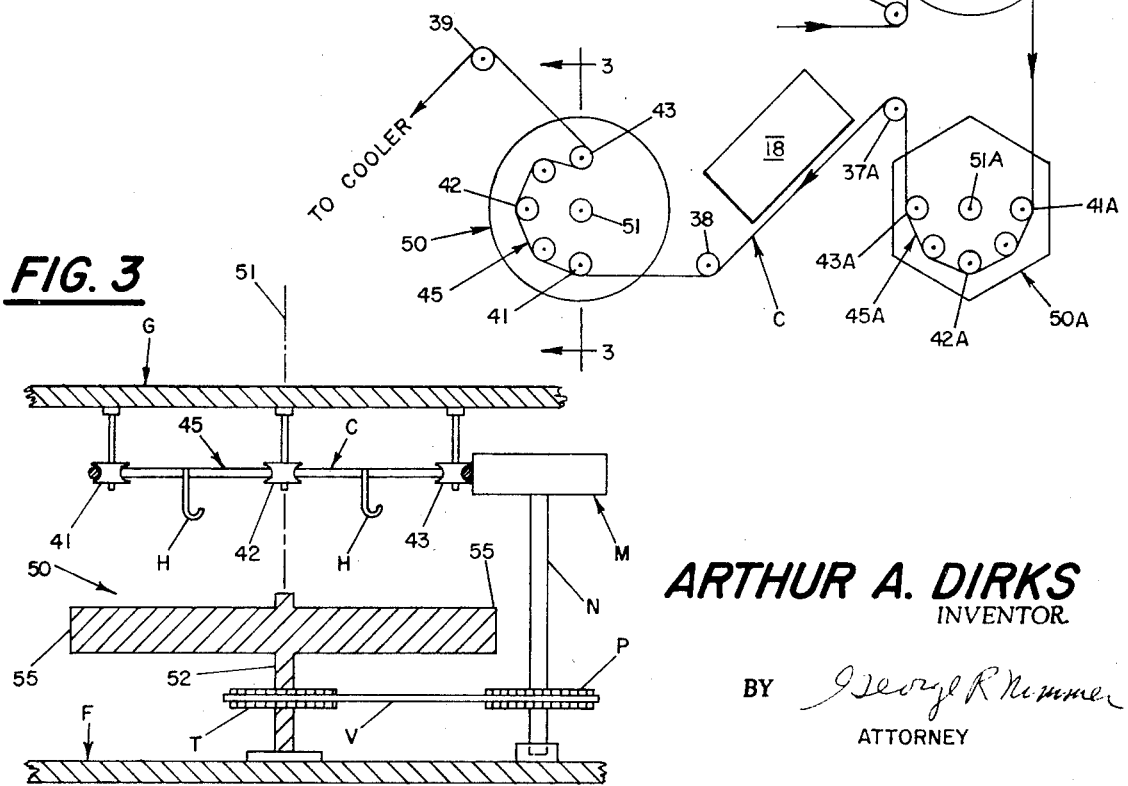

The FIG. 3 sectional elevational view schematically indicates that the conveyor-line arcuate proximal-segment is elevated above the turntable dressing station and that there are means for causing the turntable and the conveyor-line proximal-segment to travel at substantially identical angular velocities about the turntable upright-axis. While the FIG. 3 sectional elevational view is taken through the circular turntables 50 of FIG. 2, a sectional elevational view taken through the regularly polygonal turntable 50A would have a similar appearance. It is readily seen in FIG. 2 that the horizontal turntable 50 might include a co-rotatable central upright-shaft 52 extending along the turntable central upright-axis 51 and rotatably secured to the factory floor "F." Each of the guide pulleys for conveyor-line "C," and including pulleys 41–43, is located between the turntable and the factory ceiling "G;" herein, each of the guide pulleys is in fact suspended some selected distance from factory ceiling "G." As is well known in the prior art, conveyor-line "C" might carry attachment means, e.g., depending hooks "H," spaced at selected intervals therealong whereby factory-work pieces might be appropriately suspended at selected regular intervals along conveyor-line "C." The entire conveyor-line "C" is driven at some selected speed rate throughout the typical factory installation (FIGS. 1 and 2) through the factory's power and control center (not shown). Thus, the angular velocity of each conveyor-line arcuate proximal-segment about the turntable upright-axis would in fact be directly dependent upon the speed selected for the conveyor-line "C" to travel throughout the factory (as from kill area 11 to the final storage or cooler).

FIG. 3 schematically indicates a simplified means for causing the conveyor-line arcuate proximal-segment portion 45–45A and the vertically aligned portions of the turntable to travel at substantially the same angular velocity about the turntable upright-axis. In this manner, the workman standing immobile upon the rotating turntable immediately below the conveyor-line arcuate proximal-segment might be made to automatically follow a factory-work piece suspended from the conveyor-line. Moreover, a plurality of workmen, if there be a plurality of animal carcasses suspended from the proximal-segment, might stand at regular angular intervals upon the turntable. A gearbox "M" is herein actuatably connected to conveyor-line "C," gearbox "M" having a depending rotating shaft "N" which carries a co-rotatable gear "P" at the lower portion thereof. The turntable rotatable shaft 52 is provided with a co-rotatable gear "T" at the lower portion thereof, an endless annular chain "V" actuatably connecting gear "P" to gear "T." Thus, through appropriate empirical selection for the respective diameters of gears "P" and "T" the co-ordinated angular velocities of the turntable and the conveyor-line "C" about the turntable upright-axis 51 can be readily achieved. Electrical means, and other velocity synchronization means, are also deemed to serve the purposes herein.

Figure 3A:
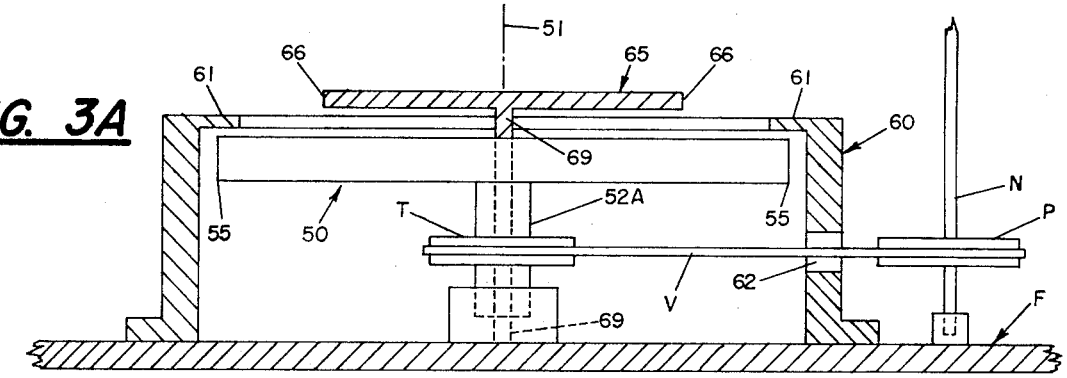
FIG. 3A is a schematic view, similar to FIG. 3, showing the use of at least one stationary platform alongside the rotatable turntable.

FIG. 3A schematically indicates that the rotatable turntable type processing station concept of the present invention might be provided with one or more stationary platforms to assist operating personnel in entering and leaving the rotatable turntable at appropriate time intervals. For example, the rotatable turntable 50 might be provided with a substantially horizontal outward stationary platform 60 that at least partially surrounds (and herein completely surrounds) the outward peripheral-boundary 55 of rotatable turntable 50. Stationary platform 60 preferably includes an inwardly extending annular upper lip 61 positioned above turntable 50 and that extends inwardly of turntable outward periphery 55 thus precluding an operator from endangering himself between the rotatable element 50 and the stationary element 60. The elongate endless belt "V" herein passes through a sideward opening 62 of the stationary platform 60. Moreover, the rotatable turntable 50 might be provided with a substantially horizontal inward stationary platform 65. Herein, stationary platform includes a depending shaft 69 extending along upright-axis 51 within tubular shaft 52A which is co-rotatable with turntable 50, stationary shaft 69 being mountable on the factory floor "F." The inward stationary platform periphery 66, which herein completely surrounds upright-axis 51, is located some finite distance inwardly of the outward platform inward extremity 61. Thus, as can be readily seen in FIG. 3A, some finite radial distance (or spatial gap) exists between the stationary platforms 60 and 65 to allow operating personnel to be positioned upon turntable 50. With the one or more stationary platforms schematically alluded to in FIG. 3A, it is possible for operating personnel to embark from a stationary platform at the strategic moment when the factory-work piece, e.g., "H" from "C," tangentially arrives at the turntable. The operator, upon concluding his assigned task, can transfer himself from the turntable to a stationary platform as the factory-work piece tangentially leaves the turntable area.

Figure 4:
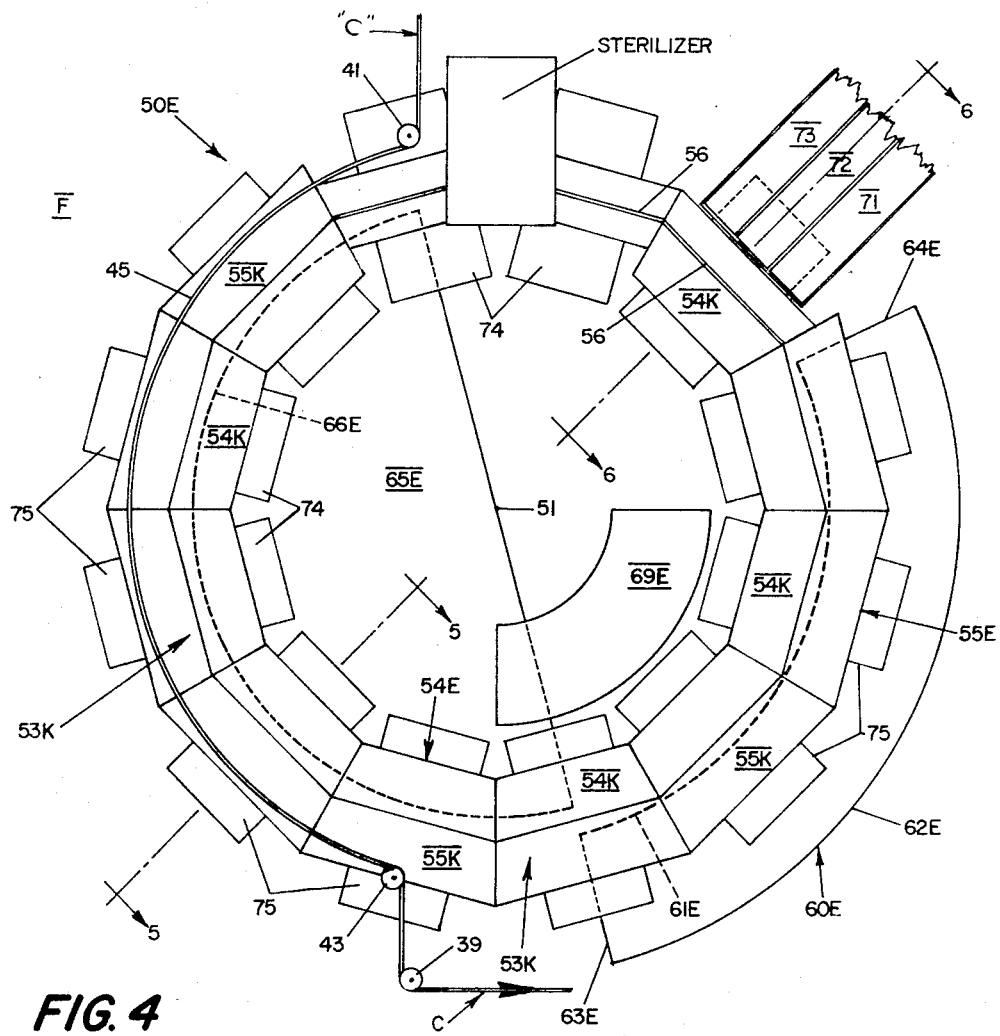
FIG. 4 is a top plan view of a meat carcass viscerating station embodiment of the novel rotatable turntable processing station concept of the present invention.
Figure 5:
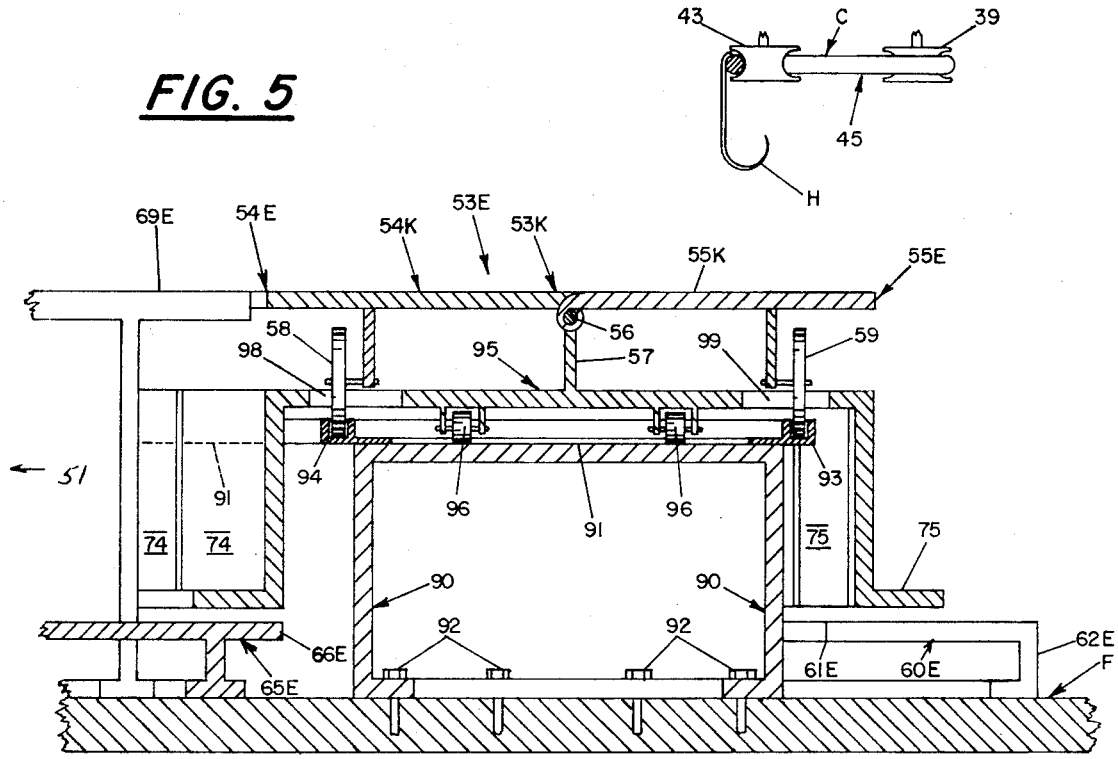
FIG. 5 is a sectional elevational view taken along line 5—5 of FIG. 4.
Figure 6:
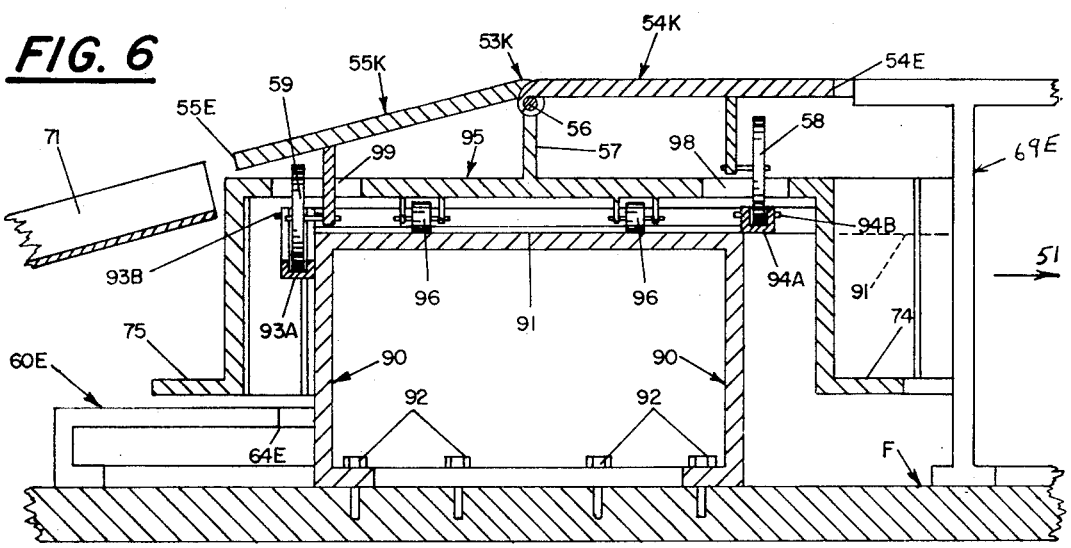
FIG. 6 is a sectional elevational view taken along line 6—6 of FIG. 4.

As is indicated in FIGS. 4-6, the turntable processing station concept of the present invention is adapted even for highly complicated assembly line tasks, such as animal carcass viscerating procedures within a meat processing plant. In general, the rotatable turntable 50E has a regular polygonal (herein 12-sided) outward peripheral-boundary 55E and a regularly polygonal (12-sided) inward peripheral-boundary 54E. Both peripheral-boundaries 54E and 55E concentrically surround turntable upright-axis 51, and turntable 50E has a regular radial-width 54E–55E. Turntable 50E has a substantially horizontal annular tabletop portion 53E, herein having a substantially constant radially extending finite-width 54E–55E, as defined by the respective concentric polygonal peripheral-boundaries 54E–55E. Annular turntable 50E might include depending operator-carrier means, such as a plurality of depending operator-carriers 74 and 75 which are co-rotatable with said tabletop portion 53E and located therebelow. Herein each of the twelve chordal sides or segments of the annular turntable 50E includes an inward operator-carrier 74 and an outward operator-carrier 75. There is a semi-circular horizontal inward stationary platform 65E extending radially outwardly from upright-axis 51 and beyond the annularly array operator-carriers 74 to terminate as a semi-circular periphery 66E beneath annular tabletop 53E. Thus, assuming that animal carcasses are suspended (as from "H") at regular intervals from the conveyor-line arcuate proximal-segment 45, such as for example six suspended carcasses spaced between pulleys 41 and 43, identical visceration tasks could be performed substantially simultaneously on four of the carcasses by workers stationed upon operator-carrier 74 of four respective chordal segments of turntable 50E. when a finished carcass (with viscera carried by tabletop 53E) approaches the end 43 of proximal-segment 45, the worker(s) would depart from the operator-carrier 74 at his assigned chordal segment and walk along stationary platform 65E toward pulley 41 to mount the next available chordal segment's operator-carrier. Thus, six carcasses located between pulleys 41 and 43 could be easily handled by a team of six workmen, two of whom would be "getting ready" on stationary platform 65E. Of course, the exact number of workmen to be assigned to the conveyor-line proximal-segment 45 would be dependent upon the selected speed of the conveyor-line "C," and the incremental spacing therealong of the suspended animal carcasses.

Assuming that the first team of workers have deposited the carcass viscera upon the tabletop 53E(which is rotating in the selected counterclockwise direction of FIG. 4), a second team of workmen might be employed in conjunction with rotating turntable 50E to perform sorting or other work upon the viscera. In this vein, there is a horizontal outward stationary platform 60E having an arcuate inner terminus 61E located below tabletop 53E and an arcuate outer terminus 62E located radially outwardly of tabletop 53E. Stationary platform 60E has a leading end 63E nearer to pulleys 39 and 43 and has a trailing end 64E more remote from said pulleys. There might be a relatively lofty second inward stationary platform 69E positioned sectorially nearer to outward platform leading end 63E and a bank of downwardly extending chutes 71-73 located downstream of platform trailing end 64E. Thus, workmen stationed upon the outward operator-carrier 75 of the respective turntable chordal segments might perform their assigned tasks upon visceral carried by tabletop 53E, certain viscera portions being manually cast onto stationary platform 69E, while remaining sorted viscera could be directed into one of the chutes 71-73. A workman upon completing his assigned task would depart from the operator-carrier 75 as he nears trailing end 64E whereupon the workman could walk along stationary platform 60E in the FIG. 4 clockwise direction to mount the next available chordal segment of turntable 50E.

The regularly polygonal turntable 50E of FIGS. 4–6 has, for the purposes of illustration herein, 12 straight chordal segments 53K. However, it is to be understood that the number of chordal segments might be arbitrarily varied or selected. The 12 identical straight chordal segments 53K together define tabletop 53E, and each of the straight chordal side segments 53K is detachable from the two immediately adjacent chordal segments 53K. As can best be seen in FIGS. 5 and 6, each chordal segment 53K comprises a pair of downwardly pivotably attached trapezoidal plates 54K and 55K, each rotatably secured to a horizontal pivot-pin 56. There is an inner-plate 54K 12 such inner-plates 54K together defining tabletop inward peripheral-boundary 54E), and there is an outer-plate 55K (12 such outer-plates 55K together defining tabletop outward peripheral-boundary 55E).

As is alluded to in FIG. 4 for the herein counterclockwise rotatable turntable 50E, the majority (herein nine) of the chordal segments 53K for annular rotatable tabletop 53E need to be maintained horizontally elevated above the factory floor "F." In this vein, and as seen in FIG. 5, there is an annular stationary-base 90 (having an inverted-U regular cross-sectional shape) and having a planar upper surface 91, said annular-base 90 (including surface 91) circularly concentrically surrounding turntable upright-axis 51 and being non-rotatably fixedly attached to factory floor "F" as by bolts 92. There is an annular revolvable-base 95, circularly concentrically surrounding turntable upright-axis 51, the lower side of horizontal revolvable-base 95 being provided with depending wheels 96 for rollable support upon the stationary-base annular upper surface 91. Extending integrally upwardly from revolvable-base 95 and attached to pivot-pin 56 is an elevator-bar 57 which serves to maintain the pivot-pin 56 portion of rotatable tabletop 53E horizontally parallel to upper surface 91 and to floor "F." The inward and outward L-shaped operator-carriers 74 and 75 are integrally attached to and extend downwardly from the annular revolvable-base 95 and thus co-rotatable with tabletop 53E. Each of the plates 54K and 55K of each chordal segment 53K carries a depending roller which extends through an opening of rotatable-base 95 and rollably engages a stationary track means annularly surrounding upright-axis 51. Specifically, each inner-side 54K carries a plurality of depending rollers 58 extending downwardly through an opening 98 in revolvable-base 95 and engages a non-revolvable horizontal track 94 that is attached along the annular upper portion of stationary-base 90. Similarly, each outer-plate 55K carries a plurality of depending rollers 59 extending downwardly through an opening 99 in revolvable-base 95 and engages a non-revolvable horizontal track 93 that is attached along the upper portion of stationary-base 90. Thus, it can be seen from FIG. 5 that with the horizontally level annular tracks 93 and 94, together with roller diameters for 58–59 which substantially equal the height of pivot-pin 56 above the stationary-base 90, the respective pivotably associated plates 54K and 55K will provide horizontal chordal segments 53K for the revolvable tabletop 53E.

There are means for causing downwardly pivoting of one or both of the plates 54K–55K about the horizontal pivot-pin 56. For example, as alluded to in FIG. 4, it is oftentimes desireable to temporarily downwardly pivot the outer-plate 55K at an opportune time to dump a viscera portion into a selected downwardly extending chute 71–73. Or, it is oftentimes desireable to temporarily downwardly pivot both plates 54K and 55K to allow one or more chordal-sections 53K to pass through a sterilizer unit. In this vein, and as alluded to in FIG. 6, a short section 93A of track 93 might be pivotably attached, as by pin 93B, to stationary-base 90. Thus, temporary downward pivoting of track section 93A at the strategic moment by remote control means (not shown) will cause roller 59 and outer-plate 55K to be depressed downwardly from pivot-pin 56 thereby causing classified viscera be dumped into a selected chute, e.g., 71. As also seen in FIG. 6, a short section 94A of track 94 might be pivotably attached, as by pin 94B, to stationary-base 90. Thus, if both short track sections 93A and 94A are temporarily depressed, both plates 54K and 55K will pivot downwardly of pivot-pin 56 to allow a dual-plates chordal-segment 53K to pass through a sterilizer unit before resuming a horizontal condition immediately downstream of pulley 41.

From the foregoing, the construction and operation of the revolvable assembly-line processing stations will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In a factory type installation for processing a movable processing of factory-work pieces such as animal carcasses and including an elongate continuously movable elevated conveyor of selectively variable speed and being adapted to carry at selected intervals therealong a plurality of factory-work pieces whereby factory personnel strategically stationed along the movable conveyor can perform assigned processing tasks upon the consecutively passing factory-work pieces, an improved processing station for the factory personnel and comprising: a generally horizontal turntable surrounding an upright-axis and being adapted to rotatably travel at a selectable angular velocity about said upright-axis, a minor length proximal portion of said conveyor being elevated above said rotatable turntable and having a generally arcuate configuration path whereby said conveyor is spaced a substantially constant radial distance from the turntable upright-axis, means for causing the turntable and the conveyor minor length proximal portion to travel at similar angular velocities about said turntable upright-axis, and at least one substantially stationary platform positioned immediately adjacent to the rotatable turntable and extending sectorially of the turntable upright-axis to facilitate maneuverability of factory personnel from the rotatable turntable to a said stationary platform.

2. The improved factory processing station of claim 1 wherein the continuously movable conveyor is an overhead conveyor-line adapted to removably suspendably carry at selected intervals therealong a plurality of depending meat animal carcasses; and wherein the generally arcuate proximal portion of said conveyor-line provides a generally arcuate sector exceeding about 30° with respect to the turntable upright-axis.

3. The turntable carcass dressing station of claim 2 wherein the conveyor-line proximal portion and the underlying turntable are adapted to travel continuously at a constant angular velocity; wherein the continuously rotatable turntable has an outward peripheral-boundary completely concentrically surrounding the turntable upright-axis; and wherein the turntable is elevated above the floor level of the factory type installation.

4. The turntable dressing station of claim 3 wherein the turntable has an inward peripheral-boundary completely surrounding the turntable upright-axis whereby the turntable has a radial-width extending radially outwardly from the inward peripheral-boundary to the outward peripheral-boundary; and wherein there is a substantially horizontal inward stationary platform extending radially inwardly from and detached from the turntable inward peripheral-boundary.

5. The turntable dressing station of claim 4 wherein at least one of said stationary platforms extends peripherally along at least 25 percent of a turntable peripheral-boundary and is adapted to carry factory personnel thereon.

6. The turntable dressing station of claim 5 wherein at least a portion of one of said stationary platforms extends between the turntable inward and outward peripheral-boundaries to minimize the possibility of injury to factory personnel.

7. The turntable dressing station of claim 1 wherein the turntable structure includes a substantially horizontal tabletop portion and further includes depending operator-carrier means in co-rotatable relationship with the said tabletop portion.

8. The turntable dressing station of claim 7 wherein the depending operator-carrier means effectively completely surrounds the said turntable upright-axis.

9. The turntable dressing station of claim 8 wherein the turntable tabletop portion has a substantially constant radially extending finite-width defined by an outer-boundary and an inner-boundary for said tabletop, both said tabletop boundaries surrounding the turntable upright-axis.

10. The turntable dressing station of claim 9 wherein the tabletop outer-boundary and inner-boundary are of regular polygonal shape; and wherein each chordal segment of the tabletop respective boundaries is provided with a co-rotatable underlying operator-carrier.

11. The turntable processing station of claim 1 wherein the turntable includes a substantially horizontal tabletop portion having a substantially constant radially extending finite-width defined by an outer-boundary and an inner-boundary for said tabletop portion, both said tabletop boundaries being of geometrically similar polygonal shape and concentrically surrounding the turntable upright-axis.

12. The turntable station of claim 11 wherein each straight chordal side of said polygonal tabletop is detachable from the two adjacent chordal sides for said polygonal tabletop.

13. The turntable station of claim 12 wherein each chordal tabletop side comprises a pair of downwardly pivotably attached horizontal plates including an inner-plate extending along the tabletop inner-boundary and an outer-plate extending along the tabletop outer-boundary, the inner-plate and the outer-plate being selectively independently downwardly pivotal ancillary to sterilizing and viscera sorting operations.

14. The turntable structure of claim 13 wherein there is at least one depending operator-carrier positioned remote from the tabletop finite-width and co-rotatable with the tabletop.

* * * * *